United States Patent
Joshi et al.

(10) Patent No.: US 9,715,484 B1
(45) Date of Patent: Jul. 25, 2017

(54) PROVIDING DIFFERENT FONT HINTS BASED ON DEVICE, TEXT AND FONT CONTEXT

(71) Applicant: Amazon Technologies, Inc., Reno, NV (US)

(72) Inventors: Lokesh Joshi, Marcer Island, WA (US); Shinobu Matsuzuka, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 513 days.

(21) Appl. No.: 13/784,718

(22) Filed: Mar. 4, 2013

(51) Int. Cl.
*G06F 17/00* (2006.01)
*G06F 17/21* (2006.01)

(52) U.S. Cl.
CPC .................................. *G06F 17/214* (2013.01)

(58) Field of Classification Search
CPC ..................................................... G06F 17/214
USPC .......................... 345/469; 715/256, 269, 270
See application file for complete search history.

(56) References Cited

U.S. PATENT DOCUMENTS

| | | | | |
|---|---|---|---|---|
| 5,528,742 A | * | 6/1996 | Moore et al. | 715/205 |
| 5,577,177 A | * | 11/1996 | Collins et al. | 345/469 |
| 5,781,714 A | * | 7/1998 | Collins et al. | 345/471 |
| 5,982,387 A | * | 11/1999 | Hellmann | 345/469 |
| 6,073,147 A | * | 6/2000 | Chan | G06F 17/214 345/467 |
| 6,295,538 B1 | * | 9/2001 | Cooper et al. | |
| 6,760,028 B1 | * | 7/2004 | Salesin et al. | 345/469 |
| 6,853,980 B1 | * | 2/2005 | Ying | G06Q 30/06 705/26.62 |
| 7,068,276 B2 | * | 6/2006 | Salesin et al. | 345/469 |
| 2005/0151741 A1 | * | 7/2005 | Salesin et al. | 345/471 |
| 2005/0162430 A1 | * | 7/2005 | Stamm et al. | 345/472 |
| 2006/0111971 A1 | * | 5/2006 | Salesin et al. | 705/14 |
| 2013/0067319 A1 | * | 3/2013 | Olszewski et al. | 715/234 |
| 2014/0153012 A1 | * | 6/2014 | Seguin et al. | 358/1.11 |

* cited by examiner

*Primary Examiner* — Matthew Ludwig
(74) *Attorney, Agent, or Firm* — Lowenstein Sandler LLP (57) ABSTRACT

A method and system to provide font hints for text is described. An example method includes identifying a plurality of fonts of the text, determining a suggested order of hint types for each font based on rendering context, and sending, to a user device, the fonts and a suggested order of hint types for each font.

14 Claims, 9 Drawing Sheets

PROVIDING DIFFERENT FONT HINTS BASED ON DEVICE, TEXT AND FONT CONTEXT

BACKGROUND

A large and growing population of users employs various electronic devices to read digital content such as articles, journals, magazines, electronic books (e-books), news feeds and blog feeds. Among these electronic devices are e-book readers (also known as e-readers), cellular telephones, personal digital assistants (PDAs), portable media players, tablet computers, netbooks, and the like.

These electronic devices sometimes use font hinting to improve the reading experience of users. Font hinting refers to the use of programmable instructions to adjust the display of an outline font so that it lines up with a rasterized grid. As e-readers and other electronic devices continue to proliferate, finding inexpensive and effective ways to use font hinting for producing a clear, legible text continues to be a priority.

BRIEF DESCRIPTION OF THE DRAWINGS

Embodiments of the present disclosure will be understood more fully from the detailed description given below and from the accompanying drawings of various embodiments of the present invention, which, however, should not be taken to limit the present invention to the specific embodiments, but are for explanation and understanding only.

DETAILED DESCRIPTION

The present disclosure is directed to providing different font hint type options for text presented on a user device. Text refers to one or more characters displayed as part of an electronic document or a user interface. An electronic document may be a newspaper article, a journal article, an electronic book (e-book), a news feed, a blog feed, or any other digital media item that includes text and can be rendered on a display of a user device such as an e-reader or another mobile device. An electronic document may include document-specific fonts ("embedded fonts") for the presentation of text. A user interface may be a graphical user interface (GUI) provided by an operating system or an application running on a user device. Text may be presented in user interfaces using system fonts (fonts pre-installed on a user device for use by an operating system or other software running on the user device).

When rendering characters on a display screen, a user device can use font hinting that represents a set of mathematical instructions for adjusting the display of an outline font so that it lines up with a rasterized grid on the screen of the user device. A user device may support several hint types including, for example, Native hinting, Delta hinting, Auto hinting, Y Align hinting, etc. Native hinting may refer to instructions embedded by a designer for overall sizing and alignment. Delta hinting may refer to instructions for alignment per character and per point (or pixel) size. Auto hinting may refer to instructions generated in real time (at the time of character rendering) for alignment and uniform stem width. Y Align hinting refers to instructions for addressing weak alignment and stem correctness.

Embodiments of the present disclosure evaluate what hint types can provide optimal results for rendering text based on rendering context, and suggest a priority order for using hint types on a user device. Rendering context can include specific character encodings of text, character sizes of the text, formatting styles of the text, a type of user device to present the text, a type of rendering engine of the user device, or any combination of the above. The user device can then select, for each portion of the text, the highest priority hint type that corresponds to the user device capability.

Figure 1:
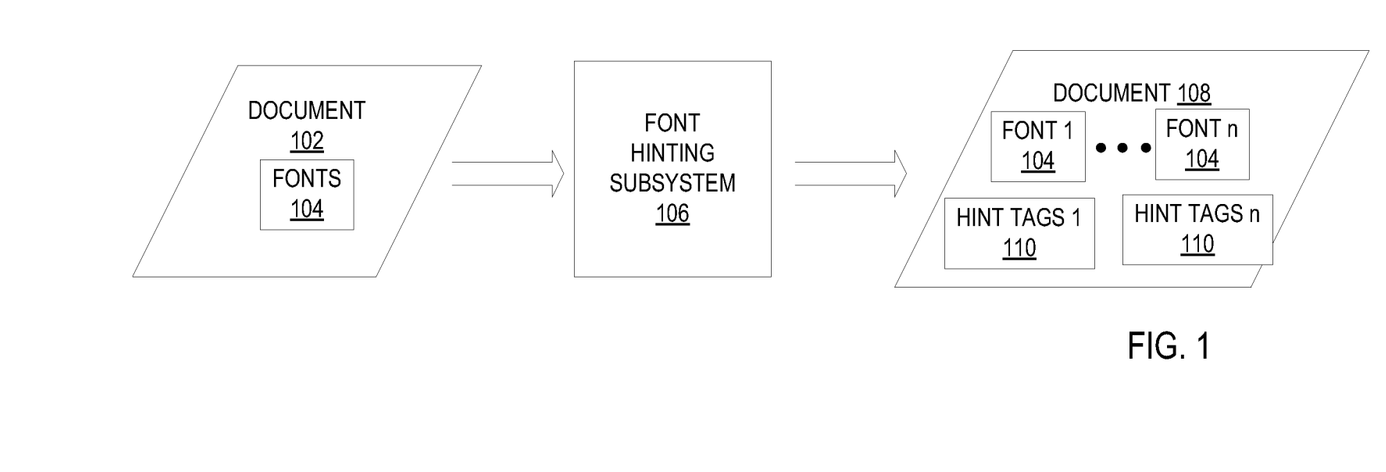
FIG. 1 illustrates a context-based font hinting mechanism in accordance with some embodiments of the present disclosure.

FIG. 1 illustrates a context-based font hinting mechanism for improving presentation of electronic documents, in accordance with some embodiments of the present disclosure. Electronic documents may be received from different content providers (e.g., publisher websites, newspaper services, etc.) and may be converted into a format readable by user devices as part of an ingestion phase. An electronic document such as an electronic document 102 may include embedded fonts (e.g., Arial, Palatino, Calibri, etc.) 104. During ingestion, a font hinting subsystem 106 may analyze fonts 104 and determine whether each font 104 is hinted by, for example, parsing tables and flags included in the font data to find properties specifying a hint type to be used with the font 104. For instance, the presence of certain tables in the font data (e.g., tables prep, fpom and cvt in font data of TrueType text) can indicate that the font is hinted or the font data may include hinting instructions for various glyphs. If the font 104 is hinted, the font hinting subsystem 106 determines the quality of the specified hint type. In one embodiment, the hint quality can be determined by simulating the presentation of a respective portion of the electronic document using the specified hint type and estimating how closely the simulated presentation matches an example of a sufficient quality as previously classified by, for example, an expert. The estimation can be performed using a machine learning technique (e.g., a support vector machine (SVM) algorithm, a neural network algorithm, etc.) or any other classification technique. The estimation can result in a quality score for a hint type at the font level. Alternatively, multiple hint quality scores can be produced for a combination of font and one or more other parameters including, for example, specific character encodings of the electronic document, character sizes of the electronic document, formatting styles of the electronic document, a type of a user device to present the electronic document, a type of a rendering engine of the user device, Unicode values, outline point values, etc.

If any of the quality scores is below a threshold, the font hinting subsystem 106 can use predefined hint data to select hint types of better quality applicable to a combination of specific font and one or more other parameters discussed above. The predefined hint data can include various available hint types with their quality scores determined in advance (e.g., empirically based on prior experimentation). Similarly, if the font 104 is not hinted, the font hinting subsystem 106 can also use the predefined hint data to select a set of hint types applicable to a combination of specific font and one or more other parameters discussed above.

Based on the quality scores, the font hinting subsystem 106 can create a hint tag set 110 for each font 104, where each hint tag set 110 includes a suggested order of hint types for rendering characters of the electronic document 102 on the user device. Hint tag set 110 may be in the form of metadata added to font 104. In one embodiment, hint tag set 110 provides suggestions at the font level (e.g., for all styles and character sizes). Alternatively, hint tag set 110 can provide suggestions for individual styles and/or individual character or point sizes.

The resulting electronic document 108 that includes hint tag sets 110 for the embedded fonts can then be distributed to various user devices designated to receive this electronic document. During the presentation of the electronic document 108, a user device can use the hint tag sets 110 to select the best possible hint type for a particular font depending on the capability of the user device. The capability of the user device may be based on the type of user device or the type of rendering engine of the use device, and may indicate whether a certain hint type is supported by the user device and/or the rendering engine and can be used without requiring significant processor and memory resources and without deteriorating the user experience.

In some embodiments, the font hinting subsystem 106 operates when installing system fonts or updating system fonts on a user device. Similarly to embedded fonts, the font hinting subsystem 106 may analyze system fonts to create hint tag sets for the system fonts, where each hint tag set includes a suggested order of hint types for rendering text on a user device. A hint tag set may be in the form of metadata added to a system font and may provide suggestions at the font level (e.g., for all styles and character sizes) or for individual styles and/or individual character or point sizes.

The system fonts with corresponding hint tag sets can then be installed on various user devices. During the presentation of a user interface, a user device can use the hint tag sets to select the best possible hint type for a particular system font depending on the capability of the user device. The capability of the user device may be based on the type of user device or the type of rendering engine of the use device, and may indicate whether a certain hint type is supported by the user device and/or the rendering engine and can be used without requiring significant processor and memory resources and without deteriorating the user experience.

Figure 2:
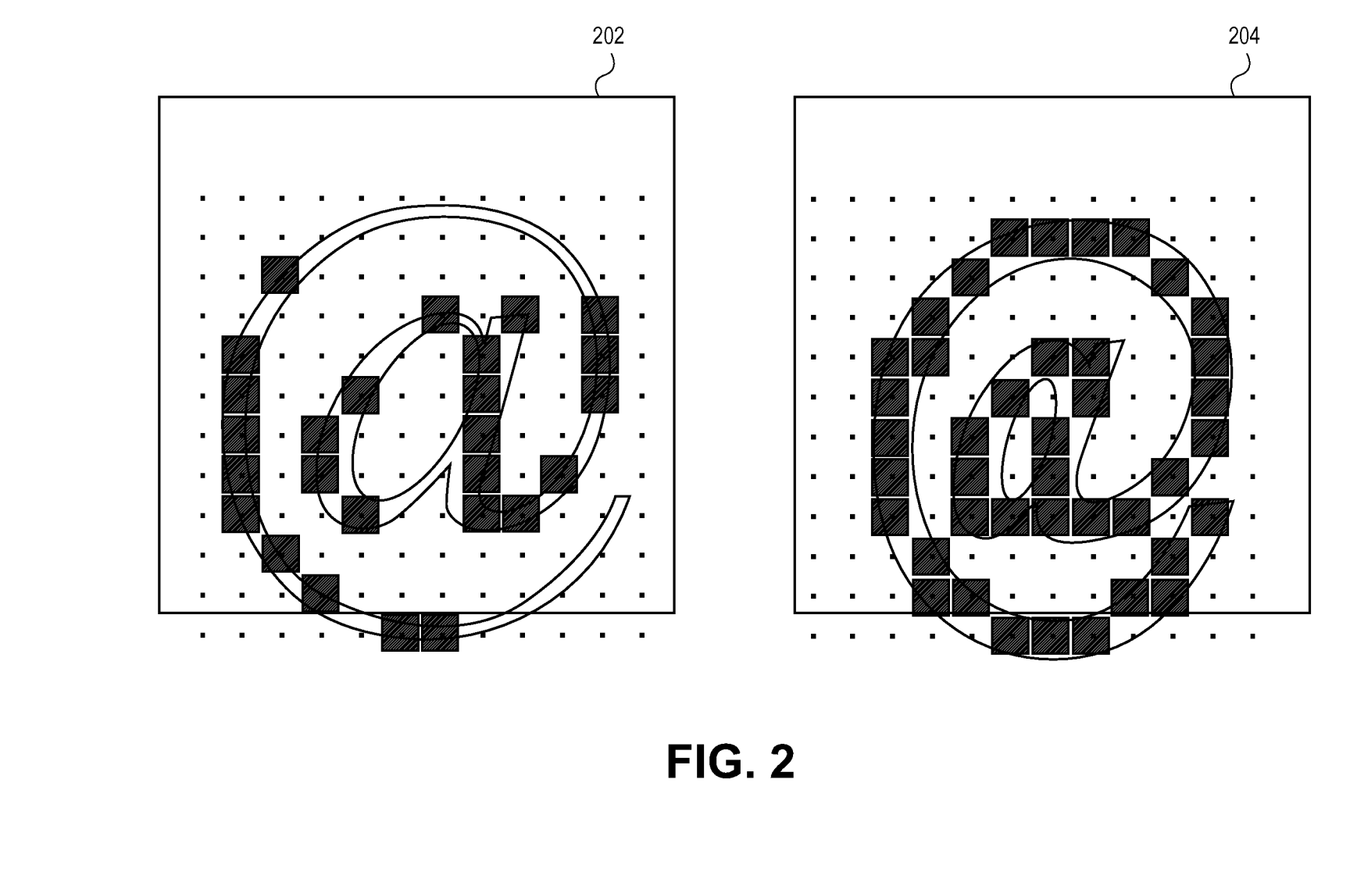
FIG. 2 illustrates one example of an improvement achieved by font hinting in accordance with some embodiments of the present disclosure.

FIG. 2 illustrates one example of an improvement achieved by font hinting in accordance with some embodiments of the present disclosure. Image 202 shows a character rendered without the use of font hinting, resulting in dropout of several pixels defining the character. Image 204 shows the same character that is subsequently rendered with the use of font hinting.

Figure 3:
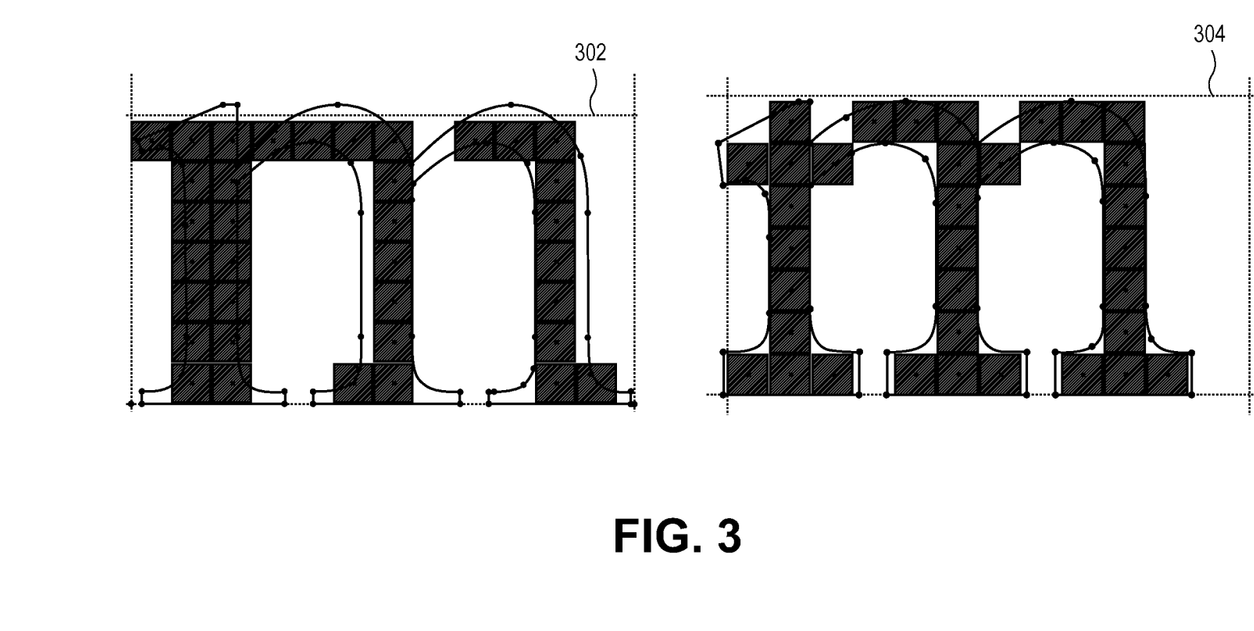
FIG. 3 illustrates another example of an improvement achieved by font hinting in accordance with some embodiments of the present disclosure.

FIG. 3 illustrates another example of an improvement achieved by font hinting in accordance with some embodiments of the present disclosure. Image 302 shows a character rendered without the use of font hinting, resulting in a non-uniform stem width and the lack of stem alignment. Image 304 shows the same character that is subsequently rendered with the use of font hinting.

Figure 4:
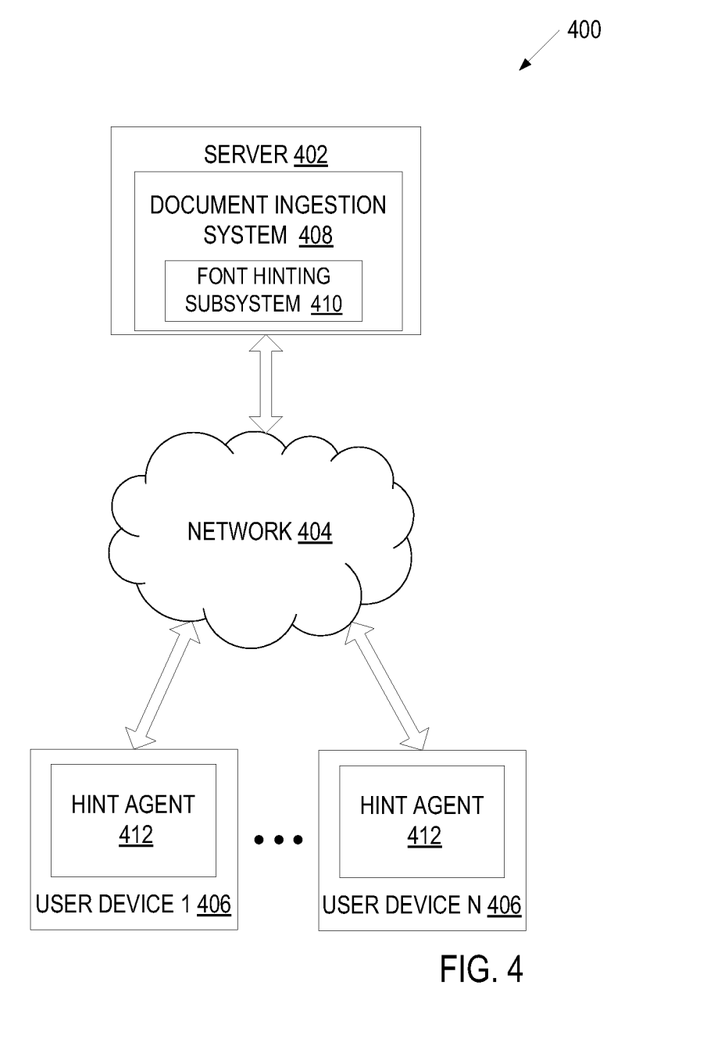
FIG. 4 is a block diagram of an exemplary network architecture in which embodiments of the present disclosure may operate.

FIG. 4 is a block diagram of an exemplary network architecture 400 in which embodiments of the present disclosure may operate. The network architecture 400 may include a server 402 and multiple user devices 406 coupled to the server 402 via a network 404 (e.g., a public network such as the Internet, a private network such as a local area network (LAN), or a virtual private network (VPN)).

The user devices 406 are variously configured with different functionality to enable consumption of electronic documents such as e-books, newspaper articles, journal articles, magazine articles, and any other electronic documents including textual content. The user devices 406 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The server 402 provides electronic documents, upgrades, and/or other information to the user devices 406 registered with the server 402 via the network 404. The server 402 also receives various requests, instructions and other data from the user devices 406 via the network 404. The server 402 may include one or more machines (e.g., one or more server computer systems, routers, gateways) that have processing and storage capabilities to provide the above functionality.

Communication between the server 402 and a user device 406 may be enabled via any communication infrastructure. One example of such an infrastructure includes a combination of a wide area network (WAN) or a VPN and wireless infrastructure, which allows a user to use the user device 406 to purchase items and consume items without being tethered to the server 402 via hardwired links. The wireless infrastructure may be provided by a wireless carrier system that can be implemented using various data processing equipment, communication towers, etc. Alternatively, or in addition, the wireless carrier system may rely on satellite technology to exchange information with the user device 406. Yet alternatively, or in combination, the wireless infrastructure may be provided by an access point (e.g., WiFi access point) provider system.

The server 402 can be part of a cloud (e.g., a public cloud, a private cloud or a hybrid cloud) maintained by a cloud provider. The server 402 can include a document ingestion system 408 that facilitates conversion of electronic documents received from various sources (e.g., book publishers, news services, content hosting websites, etc.) into a device-readable format. The document ingestion system 408 may include a font hinting subsystem 410 that provides different font hint type options for individual electronic documents. As will be discussed in more detail below, in one embodiment, the font hinting subsystem 410 analyzes fonts embedded in an electronic document, determines a suggested order of hint types for each of these fonts, and sends the electronic document, together with the suggested order of hint types for each font of the electronic document, to user devices 406. Alternatively, the font hinting subsystem 410 may be part of the device manufacturing process and may determine a suggested order of hint types for each system font. The system fonts with suggested orders of hint types may be installed on user devices 406 during the manufacturing process or may be used subsequently during an upgrade process.

Each user device 406 may include a hint agent 412 that receives fonts (e.g., embedded fonts or system fonts) with suggested orders of hint types. When presenting text, the hint agent 412 may use a suggested order of hint types for a specific font to select the best possible hint type that corresponds to the capability of the user device 406. The hint selection can be at the font level or at the style and/or the character or point size level. One embodiment of the hint agent 412 will be discussed in more detail below in conjunction with FIG. 6.

Figure 5:
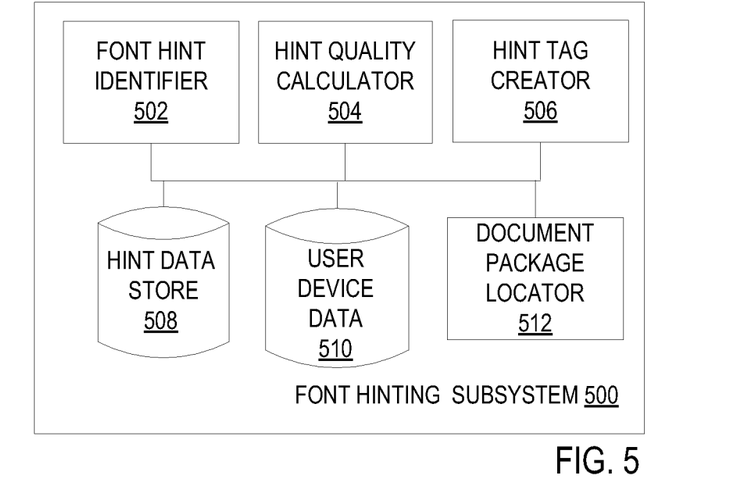
FIG. 5 is a block diagram of one embodiment of a font hinting subsystem.

FIG. 5 is a block diagram of one embodiment of a font hinting subsystem 500. The font hinting subsystem 500 may be the same as the font hinting subsystem 410 of FIG. 4. In one embodiment, the font hinting subsystem 500 includes a font hint identifier 502, a hint quality calculator 504, a hint tag creator 506, a document package creator 512, a hint data store 508, and a user device data store 510. The components of the font hinting subsystem 500 may represent modules that can be combined together or separated into further modules, according to some embodiments.

The hint data store 508 includes data specifying various hint types available for different fonts. Hint types may include, for example, native hinting, delta hinting, auto hinting, and y align hinting. The hint data store 508 may also include quality scores determined in advance (e.g., empirically based on prior experimentation) for individual fonts. Quality scores may be determined at the font level and/or for a combination of the font and one or more other parameters including, for example, specific character encodings of text, character sizes of text, formatting styles of text, a type of user device to present text, a type of rendering engine of the user device, etc.

The user device data store 510 may include hinting-related characteristics of user devices (e.g., electrophoretic ink (eInk) user devices or Android-based user devices) and rendering engines (software and/or hardware converting specifications for images into pixels) supported by user devices. These characteristics may include, for example, supported fonts, supported hint types, performance parameters (e.g., speed, expected quality, etc.) associated with individual hint types, resource requirements (e.g., processor usage, memory consumption, etc.) associated with individual hint types, etc. The hint data store 508 and the user device data store 510 may represent a single data structure or multiple data structures (databases, repositories, files, etc.) residing on one or more mass storage devices, such as magnetic or optical storage based disks, solid-state drives (SSDs) or hard drives.

The font hint identifier 503 may identify fonts (e.g., system fonts or fonts embedded in an electronic document) and determine whether each font is hinted. The font hint identifier 503 may determine whether an embedded font is hinted by first determining whether the font has a format that supports hinting (e.g., if the font is in TrueType, OpenType or any other similar format), and then analyzing tables and flags included in the font data to find properties specifying a hint type to be used with the font.

The hint quality calculator 504 calculates a quality score for the specified hint type. In one embodiment, the hint quality score can be determined by simulating the presentation of a respective portion of text using the specified hint type and estimating how closely the simulated presentation matches an example of a sufficient quality as previously classified by, for example, an expert. The estimation can be performed using a machine learning technique (e.g., a support vector machine (SVM) algorithm, a neural network algorithm, etc.) or any other classification technique. The estimation can result in a quality score for a hint type at the font level. Alternatively, multiple hint quality scores can be produced for a combination of font and one or more other parameters including, for example, specific character encodings of text, character sizes of text, formatting styles of text, a type of a user device to present text, a type of a rendering engine of the user device, etc.

If any of the quality scores is below a threshold, the font quality calculator 504 can use hint data in the hint data store 508 to select hint types with higher quality scores that are applicable to a combination of the font and one or more of the above parameters. In addition, if the font is not hinted, the font quality calculator 504 can use the hint data in the hint data store 508 to select a set of hint types, which have higher quality scores than a quality score assigned to non-hinting, and which are applicable to a combination of the font and one or more of the above parameters. For example, Japanese and Chinese texts contain base characters and ruby characters, which explain the pronunciation or meaning of the base characters. Ruby characters are smaller characters that are conventionally not hinted. The hint quality calculator 504 may select, for example, native hinting, delta hinting and y align hinting for a font at the size of base characters, and auto hinting for the font at the size of ruby characters.

The font quality calculator 504 can store the resulting hint types for the font and their quality scores in a temporary buffer. The hint tag creator 506 can create a hint tag set for each font based on the quality scores of the hint types in the temporary buffer. Each hint tag set can include a suggested order of hint types for the font. A hint tag set may be in the form of metadata added to the font and may provide suggestions at the font level (e.g., for all styles and character sizes). Alternatively, a hint tag set can provide suggestions for individual styles and/or individual character sizes. For example, in Japanese text, hiragana and katakana characters occur significantly more frequently than kanji and Latin characters. Hint tag sets may suggest the use of native hinting for hiragana and katakana characters and the use of auto hinting for kanji and Latin characters. In addition, hint tag sets may suggest the use of auto hinting specifically for smaller hiragana and katakana characters such as ruby characters. In another example, because Latin fonts are usually hinted, hint tag sets may suggest the use of native hinting for Latin characters. In yet another example, certain characters may consist of thin lines (e.g., "_", "-", "=") that may look blurry with the use of auto hinting. To address this deficiency, hint tag sets may suggest the use of native hinting specifically for the thin-line characters.

The document package creator 512 can package the electronic document with the hint tags for each of the embedded fonts, and distribute this package to various user devices designated to receive the electronic document. Alternatively, the document package creator 512 can add hint tags to system fonts and distribute system fonts with hint tags to user devices for installation or upgrade. In other embodiments, if some user devices do not support some of the hint types, different hint tags can be created for different user devices, resulting in different document packages distributed to different user devices and/or different system font data installed on different user devices.

Figure 6:
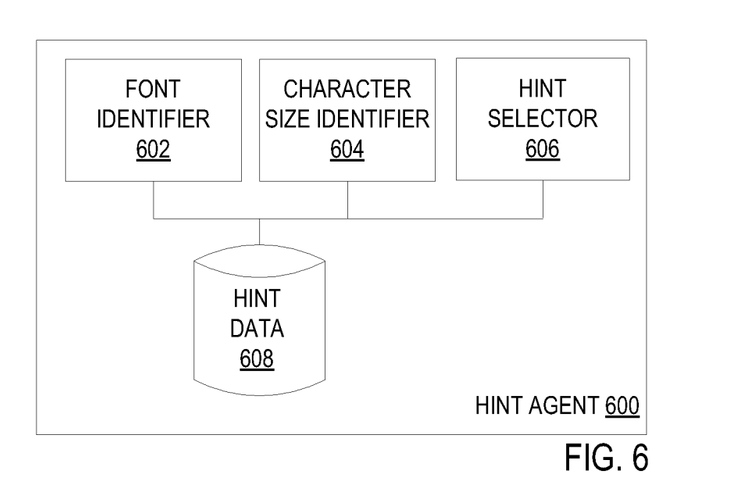
FIG. 6 is a block diagram of one embodiment of a hint agent.

FIG. 6 is a block diagram of one embodiment of a hint agent 600. The hint agent 600 may be the same as hint agent 412 of FIG. 4. In one embodiment, the hint agent 600 includes a font identifier 602, a character size identifier 604, a hint selector 606, and a hint data store 608. The components of the hint agent 600 may represent modules that can be combined together or separated into further modules, according to some embodiments.

The hint agent 600 parses font data (embedded font data or system font data) that includes hint tags for the fonts, and stores the suggested order of hint types that is specified in each hint tag in the hint data store 608. In one embodiment, the hint data store 608 can be a designated table stored as part of the font data. As discussed above, the suggested order of hint types can be at the font level, at the style level, at the character level, and/or the point size level.

When rendering text (in an electronic document or in a user interface), the hint agent 600 interprets suggestions of the hint type orders that are stored in the hint data store 608 and applies font hinting accordingly. In one embodiment, the font identifier 602 detects when a new font should be used for a portion of text (e.g., in response to a user request or as provided in the rendering instructions for text), and retrieves a suggested order of hint types for the new font. If the order of hint types is suggested to be used at the font level, the hint selector 606 selects the first hint type specified in the suggested hint type order, and determines whether the first hint type corresponds to the capability of the user device. The capability of the user device may be based on the type of the user device or the type of a rendering engine of the use device, and may indicate whether a certain hint type is supported by the user device and/or the rendering engine and can be used without requiring significant processor and memory resources and without deteriorating the user experience. If the first hint type corresponds to the capability of the user device, the hint selector 606 provides the first hint type to the rendering engine. If the first hint type does not correspond to the capability of the user device, the hint selector 606 selects the next hint type specified in the suggested hint type order, and repeats the above operations for the next hint type, and so on.

If the order of hint types is suggested to be used at the character size level, the character size identifier 604 keeps track of changing character sizes. Upon detecting a different character size, the character size identifier 604 retrieves a suggested order of hint types for the different character size, and invokes the hint selector 606 to select an appropriate hint type specified in the suggested hint type order in a manner discussed above. Each time the hint selector 606 selects a different hint type, it provides this hint type to the rendering engine, which then uses this hint type when rendering characters of a smaller or bigger size than the previously rendered characters.

Figure 7:
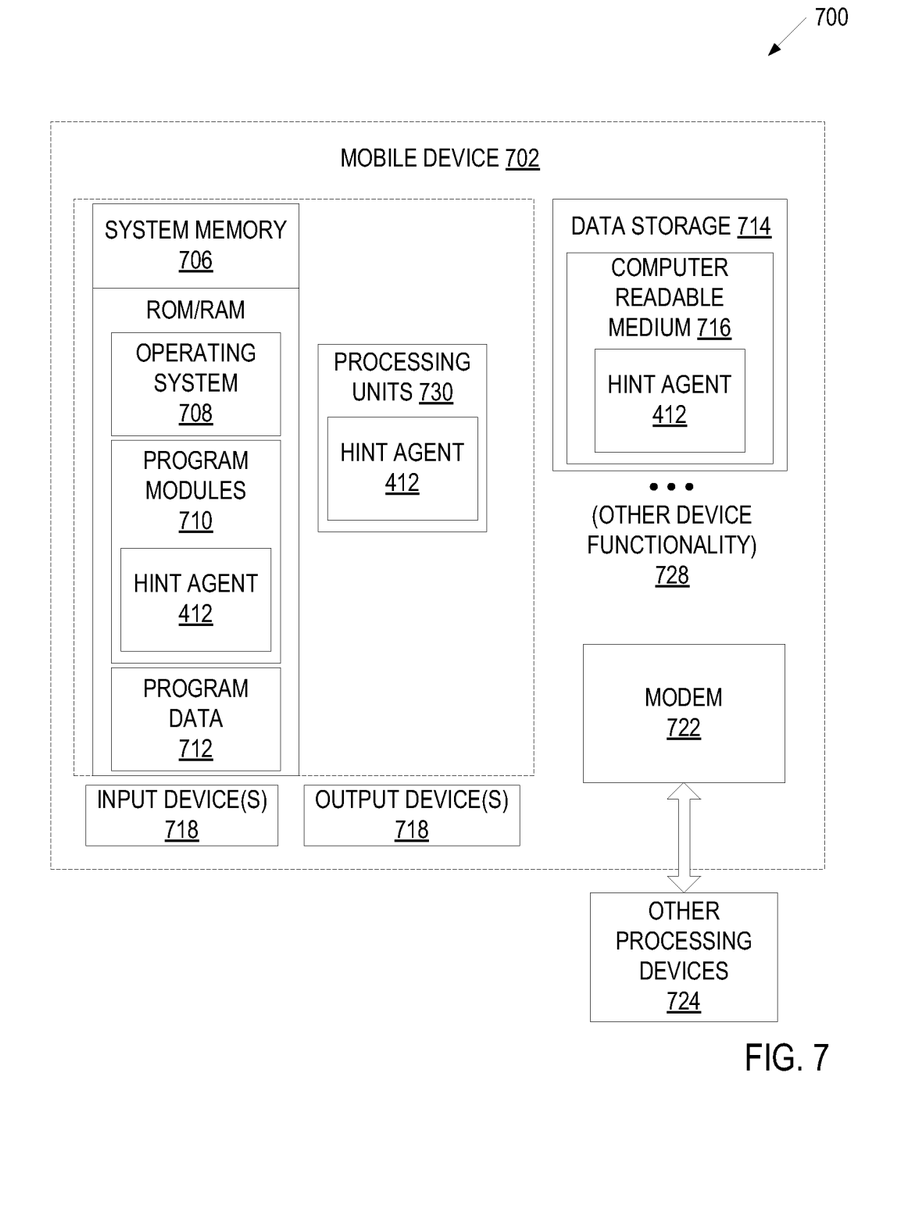
FIG. 7 is a block diagram of an example electronic device capable of utilizing font hinting when rendering text on a display screen.

FIG. 7 is a block diagram of an example user device 700 capable of utilizing font hinting when rendering text on a display screen. The user device 700 may be the same as user device 406 of FIG. 4 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 700 includes one or more processing units 704, such as one or more CPUs or processor cores. The user device 700 also includes system memory 706, which may correspond to any combination of volatile and/or non-volatile storage mechanisms. The system memory 706 may store information which provides an operating system component 708, various program modules 710 including hint agent 412, program data 712, and/or other components. The user device 700 performs functions by using the processing unit(s) 704 to execute the hint agent 412 and other instructions provided by the system memory 706.

The user device 700 may also include a data storage device 714 that may consist of one or more types of removable storage and/or one or more types of non-removal storage. The data storage device 714 may include a computer-readable medium 716 on which is stored one or more sets of instructions such as instructions of the hint agent 412 embodying any one or more of the methodologies or functions described herein. As shown, instructions of the hint agent 412 may also reside, completely or at least partially, within the system memory 706 and/or within the processing unit(s) 730 during execution thereof by the user device 700, the system memory 706 and the processing unit(s) 730 also constituting computer-readable media. The instructions of the hint agent 421 may further be transmitted or received over a network.

The user device 700 may also include one or more input devices 718 (keyboard, mouse device, specialized selection keys, etc.) and one or more output devices 720 (displays, printers, audio output mechanisms, etc.). The user device 700 may further include one or more communication interface mechanisms 722. These communication interface mechanisms 722 allow the user device 700 to interact with other processing devices 724, such as remote computers, the server 402, and so forth.

The above-enumerated list of modules is representative and is not exhaustive of the types of functions performed by the user device 700. As indicated by the label "Other Device Functionality" 728, the user device 700 may include additional functions.

Figure 8:
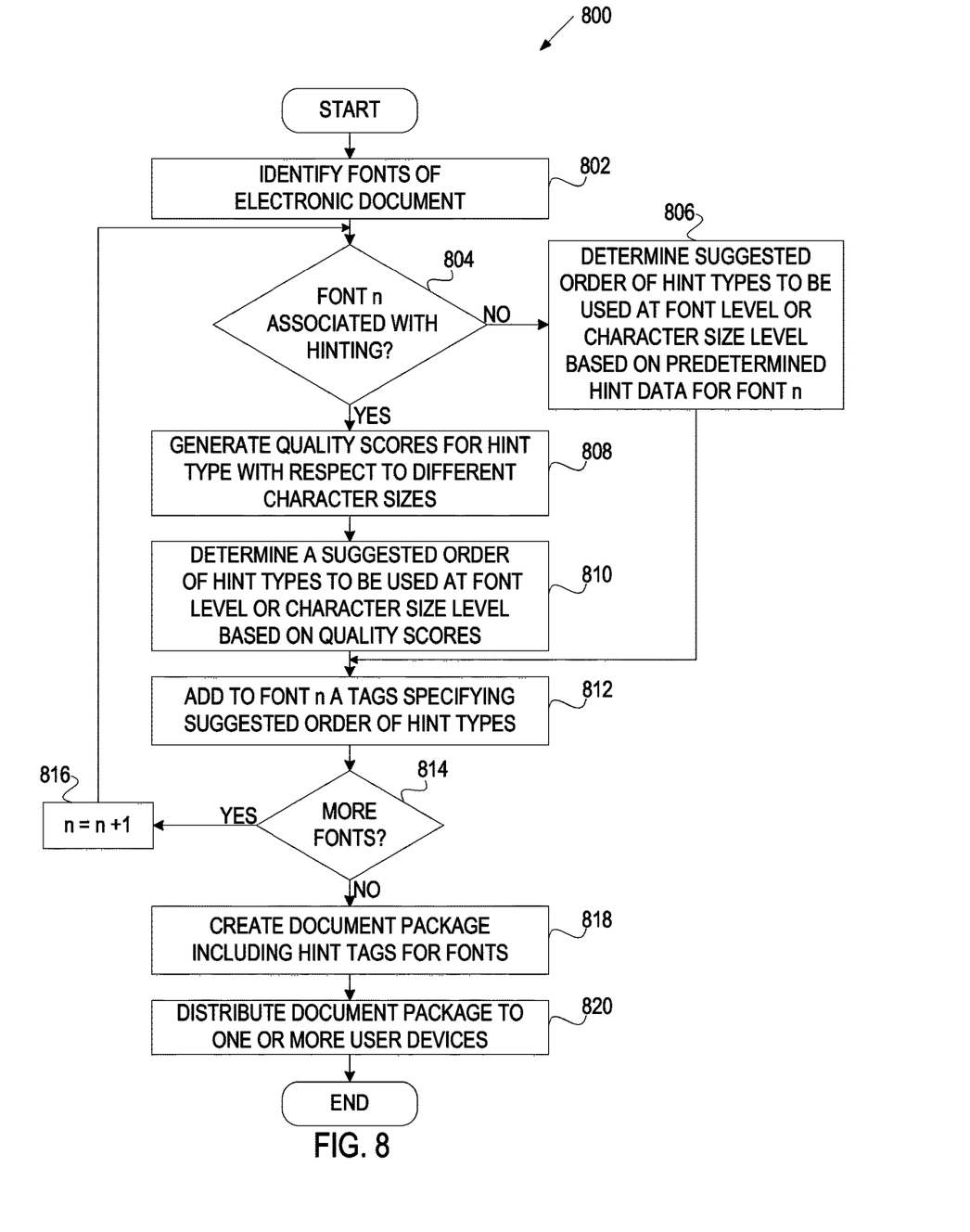
FIG. 8 is a flow diagram of one embodiment of a server-side method for providing different hint type options for an electronic document based on rendering context.

FIG. 8 is a flow diagram of one embodiment of a server-side method 800 for providing different hint type options for an electronic document based on rendering context. The method is performed by processing logic that may comprise hardware (circuitry, dedicated logic, etc.), software (such as is run on a general purpose computer system or a dedicated machine), or a combination of both. In one embodiment, the method is performed by a server (e.g., font hinting subsystem 410 of FIG. 4).

Referring to FIG. 8, method 800 begins with the server identifying fonts of an electronic document to be formatted into a device readable format (block 802). At block 804, the user device determines whether the first font ($font_n$) is associated with hinting. If not, the server determines, based on predefined hint data pertaining to $font_n$, a suggested order for using hint types with $font_n$ (block 806), and method 800 proceeds to block 812.

If $font_n$ is associated with hinting, the server generates quality scores for the hint type with respect to different character sizes (block 808), determines, based on the quality scores, a suggested order for using hint types with the font (block 810), and method 800 proceeds to block 812. As discussed above, the suggested order can be at the font level or at the character or point size level.

At block 812, the server adds to $font_n$ a tag set specifying the suggestion for the hint type order that should be used on the user device. At block 814, the server determines whether the electronic document has more embedded fonts. If so, method 800 proceeds to the next font (block 816) and returns to block 804.

If all the fonts of the electronic document have been processed, the server creates a document package that includes hint tags for the embedded fonts (block 818) and distributes the document package to one or more user devices (block 820).

As discussed above, a similar method can be used to create hint tags for system fonts to be installed on one or more user devices.

Figure 9:
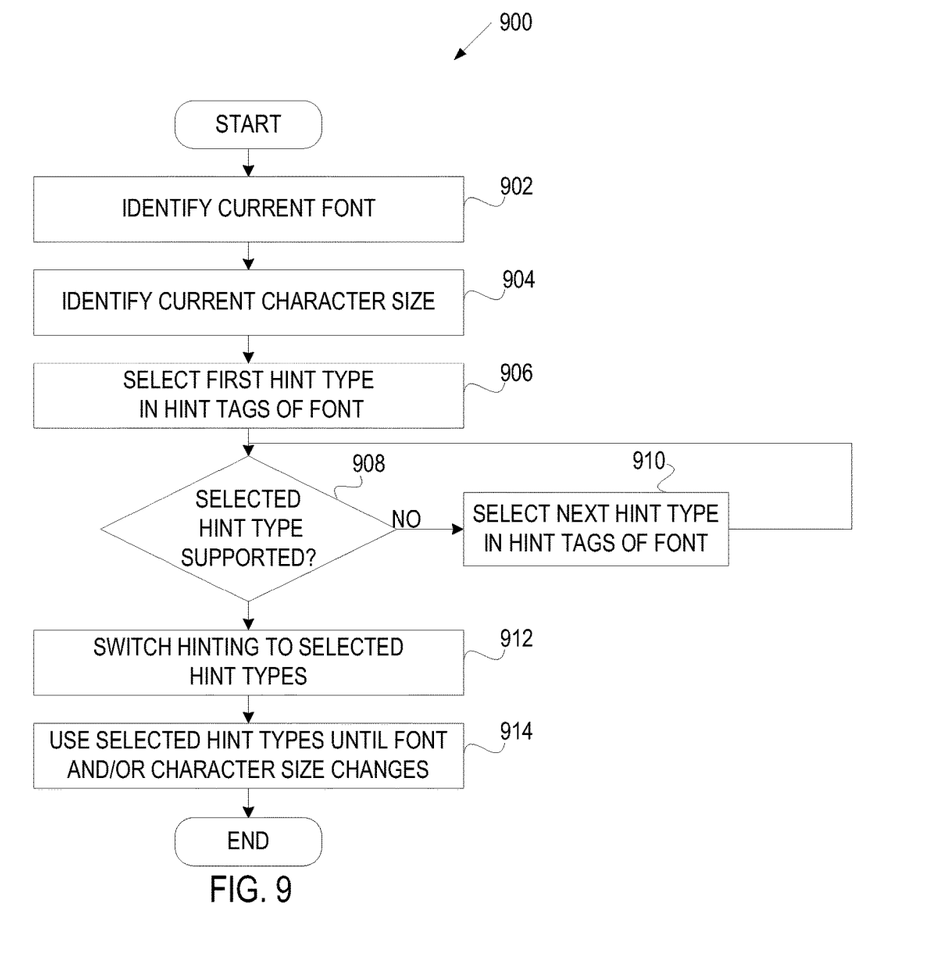
FIG. 9 is a flow diagram of one embodiment of a client-side method for selecting a font hint option for a portion of an electronic document.

FIG. 9 is a flow diagram of one embodiment of a client-side method 900 for selecting a font hint option for a portion of an electronic document. The method is performed by processing logic that may comprise hardware (circuitry, dedicated logic, etc.), software (such as is run on a general purpose computer system or a dedicated machine), or a combination of both. In one embodiment, the method is performed by a user device (e.g., user device 406 of FIG. 4).

Referring to FIG. 9, method 900 begins with the user device identifying a font to be used for a portion of an electronic document being rendered (block 902). A portion of the electronic document represents the first (initial) set of characters of the electronic document or a set of characters that should be rendered using the font other than that of a preceding set of characters. At block 904, the user device identifies the size of the first character in the document portion. At block 906, the user device reads the hint tag of the font and selects the first hint type specified in the hint tag set.

At block 908, the user device determines whether the selected hint type corresponds to the capability of the user device. If not, the user device selects the next hint tag set specified in the hint tag (block 910) and method returns to block 908. If so, the user device switches hinting to the selected hint type (block 912) and uses the selected hint type until the font or the character size changes, or until the rendering of the electronic document is completed (block 914). If the character size changes while the same font is being used, method 900 returns to block 904. If the font changes, method 900 returns to block 902. If the rendering of the electronic device is completed, method 900 ends.

As discussed above, a similar method can be used to select a hint type for a system font when rendering text in a user interface.

Figure 10:
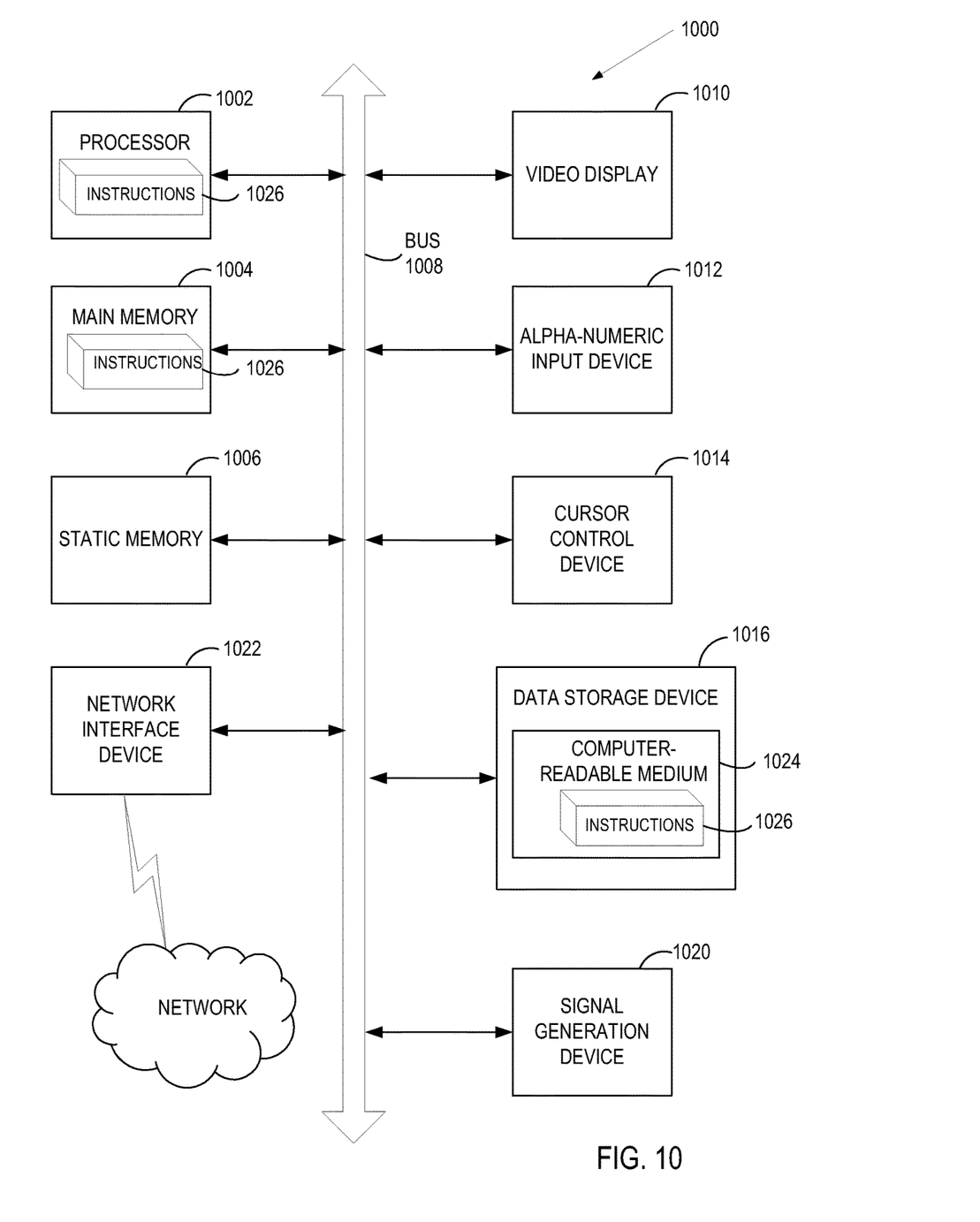
FIG. 10 illustrates an example server implementing a font hinting subsystem.

FIG. 10 illustrates an example server in the form of a computer system 1000 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing system (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1006.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute instructions 1026 of the font hinting subsystem 410 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

A drive unit 1016 may include a computer-readable medium 1024 on which is stored one or more sets of instructions (e.g., instructions 1026 of the font hinting subsystem 410) embodying any one or more of the methodologies or functions described herein. The instructions 1026 of the font hinting subsystem 410 may also reside, completely or at least partially, within the main memory 1004 and/or within the processor 1002 during execution thereof by the computer system 1000, the main memory 1004 and the processor 1002 also constituting computer-readable media. The instructions 1026 of the font hinting subsystem 410 may further be transmitted or received over a network via the network interface device 1022.

While the computer-readable storage medium 1024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "creating", "notifying", "allowing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    identifying a font of an electronic document;
    generating a simulated presentation of a respective portion of the electronic document using a first hint type of a plurality of hint types associated with the font;
    comparing characters from the simulated presentation to a predefined presentation of the characters;
    determining, by a processing device, a quality score for the first hint type, the quality score indicating how closely characters from the simulated presentation match the predefined presentation of the characters;
    creating a hint tag set for the font, the hint tag set comprising a suggested order of hint types, wherein the first hint type is arranged in the suggested order according to the corresponding quality score for the first hint type; and
    sending the electronic document with the hint tag set to a user device.

2. The method of claim 1, wherein determining the quality score for the first hint type of the plurality of hint types associated with the font comprises:
    determining that the font is hinted; and
    generating a set of scores for hint quality with respect to a plurality of character sizes based on quality analysis.

3. The method of claim 2, wherein the set of scores depends on at least one of a type of the user device or a rendering engine of the user device.

4. The method of claim 2, wherein creating the hint tag set comprises:
    determining that the font is not hinted; and
    determining a suggested order of hint types to be used at a font level or at a character size level based on predefined hint data for the font.

5. The method of claim 1, wherein the plurality of hint types comprises one or more of Native Hinting, Delta Hinting, Auto Hinting or Y Alignment Hinting.

6. A system comprising:
    a memory;
    a processing device, operatively coupled to the memory, the processing device to:
        identify a first font of a plurality of fonts for presenting text in an electronic document on a user device;
        generate a simulated presentation of a respective portion of the text using a first hint type of a plurality of hint types associated with the first font;
        compare characters from the simulated presentation to a predefined presentation of the characters;
        determine a hint tag set comprising a suggested order of hint types for the first font based on rendering context, the rendering context comprising at least one of: character encodings of the text, character sizes of the text, formatting styles of the text, a type of the user device, or a type of a rendering engine of the user device, wherein the first hint type is arranged in the suggested order according to a corresponding quality score for the first hint type, the quality score indicating how closely characters from the simulated presentation match the predefined presentation of the characters; and
        provide, to the user device, the electronic document and the hint tag set comprising the suggested order of hint types.

7. The system of claim 6, wherein to determine the suggested order of hint types for the first font, the processing device is configured to:
    determine quality scores for the hint types associated with the first font.

8. The system of claim 7, wherein to determine the quality scores for the hint types associated with the first font, the processing device is configured to:
    determine that the first font is hinted; and
    generate a set of scores for hint quality with respect to a plurality of character sizes based on quality analysis.

9. The system of claim 8, wherein the set of quality scores depends on at least one of a type of the user device and a rendering engine of the user device.

10. The system of claim 7, wherein the processing device is configured to:
    for a second font of the plurality of fonts that is not hinted, determine a suggested order of hint types to be used at a font level or at a character size level based on predefined hint data for the second font.

11. The system of claim 6, wherein the hint types comprise one or more of Native Hinting, Delta Hinting, Auto Hinting or Y Alignment Hinting.

12. A non-transitory computer-readable storage medium having stored therein instructions which, when executed by a processing device, cause the processing device to perform operations comprising:

identifying a first font of a plurality of fonts for presenting text in an electronic document on a user device;

generating a simulated presentation of a respective portion of the electronic document using a first hint type, associated with the first font, of a plurality of hint types;

comparing characters from the simulated presentation to a predefined presentation of the characters;

determining, by the processing device, a hint tag set comprising a suggested order of hint types for the first font based on rendering context, the rendering context comprising at least one of: character encodings of the text, character sizes of the text, formatting styles of the text, a type of the user device, or a type of a rendering engine of the user device, wherein a first hint type is arranged in the suggested order according to a corresponding quality score for the first hint type, the quality score indicating how closely characters from the simulated presentation match the predefined presentation of the characters; and     providing, to the user device, the electronic document and the hint tag set comprising the suggested order of hint types.

13. The computer-readable storage medium of claim 12, wherein determining the suggested order of hint types for the first font comprises:

determining quality scores for the hint types associated with the first font.

14. The computer-readable storage medium of claim 12, wherein the hint types comprise one or more of Native Hinting, Delta Hinting, Auto Hinting or Y Alignment Hinting.

\* \* \* \* \*